US012750689B2

(12) United States Patent
Prasad et al.

(10) Patent No.: US 12,750,689 B2
(45) Date of Patent: Sep. 29, 2026

(54) DYNAMIC EXTENSION OF A COMMUNICATIONS NETWORK

(71) Applicant: International Business Machines Corporation, Armonk, NY (US)

(72) Inventors: Sanjay Kumar Prasad, Gedelahalli (IN); Sanjay Bhaskara Panikkar, Bangalore (IN); Rabeela John Janorious, Bangalore (IN); Alecio Pedro Delazari Binotto, Munich (DE); Sandeep Ramesh Khairnar, Pune (IN); Sujay Nandi, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 18/150,216

(22) Filed: Jan. 5, 2023

(65) Prior Publication Data

US 2024/0236699 A1 Jul. 11, 2024

(51) Int. Cl.

*H04W 16/26* (2009.01)
*H04L 67/1087* (2022.01)
*H04W 84/18* (2009.01)

(52) U.S. Cl.

CPC ......... *H04W 16/26* (2013.01); *H04L 67/1091* (2013.01); *H04W 84/18* (2013.01)

(58) Field of Classification Search

CPC .. H04W 16/26; H04W 84/18; H04L 67/1091; H04L 67/12

See application file for complete search history.

(56) References Cited

U.S. PATENT DOCUMENTS

| | | | | |
|---|---|---|---|---|
| 9,866,313 B1 * | 1/2018 | Murphy | .............. | H04W 64/006 |
| 11,683,698 B1 * | 6/2023 | Qureshi | ................ | H04W 16/26 370/316 |
| 11,895,508 B1 * | 2/2024 | Qureshi | ................ | H04W 16/26 |
| 2017/0295609 A1 * | 10/2017 | Darrow | ................ | G05D 1/0011 |
| 2019/0289613 A1 * | 9/2019 | Fanelli | ..................... | G08G 5/22 |

(Continued)

FOREIGN PATENT DOCUMENTS

| | | | | |
|---|---|---|---|---|
| CN | 108549376 A | 9/2018 | | |
| WO | WO-2024054628 A2 * | 3/2024 | ............... | G08G 5/26 |

OTHER PUBLICATIONS

"Geoscan Pioneer Indoor Navigation System", https://www.geoscan.aero/en/products/pioneer/hive, (Retrieved: Nov. 16, 2022), 4 pages.

(Continued)

*Primary Examiner* — Liem H. Nguyen

(74) *Attorney, Agent, or Firm* — Cantor Colburn LLP; Tihon Poltavets

(57) ABSTRACT

Computer-implemented methods for dynamic extension of a communications network. Aspects include monitoring, by a processor of an unmanned vehicle, a quality of a connection to the communications network while the unmanned vehicle is traveling along a path and deploying, by the unmanned vehicle while traveling along the path, an edge communications device each time the quality of the connection is below a threshold value. Aspects also include measuring, by the unmanned vehicle, environmental data along the path and collecting, by the unmanned vehicle, the edge communications devices as the unmanned vehicle retraces the path.

19 Claims, 4 Drawing Sheets

(56) References Cited

U.S. PATENT DOCUMENTS

| | | | | |
|---|---|---|---|---|
| 2019/0364492 | A1* | 11/2019 | Azizi | H04W 52/0264 |
| 2021/0022043 | A1* | 1/2021 | Soryal | H04L 63/0876 |
| 2021/0049722 | A1 | 2/2021 | Farris et al. | |
| 2022/0148434 | A1* | 5/2022 | Vivanco | G08G 5/22 |
| 2022/0345977 | A1* | 10/2022 | Arngren | H04W 40/12 |
| 2023/0129091 | A1 | 4/2023 | Bajsarowicz et al. | |
| 2023/0147814 | A1* | 5/2023 | Carver | G01C 21/20 701/3 |
| 2024/0302841 | A1* | 9/2024 | Lu | G05D 1/2464 |

OTHER PUBLICATIONS

A. Dhekne, et al., "Extending Cell Tower Coverage through Drones", ACM, 2017, 6 pages.

A. Famili, et al., "OPTILOD: Optimal Beacon Placement for High-Accuracy Indoor Localization of Drones", arXiv preprint, 2022, 10 pages.

Anonymous, "Context Aware Managing Aggregated Infrastructure pertaining to Autonomous Vehicle Cohort with Journey Entanglement" IPCOM000270666D, IP.Com, Jul. 27, 2022, 6 pages.

D. Grabowsky, "A Breadcrumb Network for Assisting with Autonomous Robot Localization", The University of North Carolina at Charlotte, 2021, 157 pages.

D. Grabowsky, et al., "A Breadcrumb System for Assisting Outdoor Autonomous Robots with Path Identification and Localization", SoutheastCon, 2021, 6 pages.

M. Chaudhary, "A Wireless Sensor Network Breadcrumb Trail for An Autonomous Vehicle", The University of North Carolina at Charlotte, 2019, 71 pages.

V. Stavroulaki, et al., "Dedicat 6G—Dynamic Coverage Extension and Distributed Intelligence for Human Centric Applications with Assured Security, Privacy and Trust: from 5G to 6G", Joint European Conference on Networks and Communications & 6G Summit (EuCNC/6G Summit), 2021, 6 pages.

W. Power, et al., "Autonomous Navigation for Drone Swarms in GPS-Denied Environments Using Structured Learning", IFIP International Conference on Artificial Intelligence Applications and Innovations, AIAI, 2020, 30 pages.

Z. Dukowitz, "What are GPS-Denied Drones and Why Are They Important?", https://uavcoach.com/gps-denied-drones/, (Retrieved: Nov. 16, 2022), 12 pages.

Natasha Lomas, "MIT creates a control algorithm for drone swarms", https://techcrunch.com/2016/04/22/mit-creates-a-control-algorithm-for-drone-swarms/, Apr. 22, 2016, 9 pages.

No Author, "Breadcrumbs", https://web.archive.org/web/20240509070413/https://en.wikipedia.org/wiki/ Breadcrumbs, May 9, 2024, 4 pages.

Odditymall, "ProDrone—A Robotic Drone With Arms", https://www.youtube.com/watch?v=PGBvMVwpSEU, Sep. 16, 2016, 2 pages.

* cited by examiner

DYNAMIC EXTENSION OF A COMMUNICATIONS NETWORK

BACKGROUND

The present invention generally relates to processing by edge devices, and more specifically, to computer systems, computer-implemented methods, and computer program products to deploy edge devices to dynamically extend a communications network.

Network connectivity in many environments is limited or non-existent. As a result, it is often not possible to maintain network connectivity with equipment that is deployed into such environments. This lack of communications connectivity limits the functionality of computing resources that can be used in these environments. The cost and logistics associated with establishing permanent communications equipment in these environments are often prohibitive.

SUMMARY

Embodiments of the present invention are directed to a computer-implemented method of dynamically extending a communications network. According to an aspect, a computer-implemented method includes monitoring, by a processor of an unmanned vehicle, a quality of a connection to the communications network while the unmanned vehicle is traveling along a path and deploying, by the unmanned vehicle while traveling along the path, an edge communications device each time the quality of the connection is below a threshold value. The method also includes measuring, by the unmanned vehicle, environmental data along the path and collecting, by the unmanned vehicle, the edge communications devices as the unmanned vehicle retraces the path.

According to another non-limiting embodiment of the invention, a system having a memory having computer readable instructions and one or more processors for executing the computer readable instructions, the computer readable instructions controlling the one or more processors to perform operations. The operations include monitoring, by an unmanned vehicle, a quality of a connection to the communications network while the unmanned vehicle is traveling along a path and deploying, by the unmanned vehicle while traveling along the path, an edge communications device each time the quality of the connection is below a threshold value. The operations also include measuring, by the unmanned vehicle, environmental data along the path and collecting, by the unmanned vehicle, the edge communications devices as the unmanned vehicle retraces the path.

According to another non-limiting embodiment of the invention, a computer program product for dynamically extending a communications network is provided. The computer program product includes a computer-readable storage medium having program instructions embodied therewith, the program instructions executable by a processor to cause the processor to perform operations. The operations include monitoring, by an unmanned vehicle, a quality of a connection to the communications network while the unmanned vehicle is traveling along a path and deploying, by the unmanned vehicle while traveling along the path, an edge communications device each time the quality of the connection is below a threshold value. The operations also include measuring, by the unmanned vehicle, environmental data along the path and collecting, by the unmanned vehicle, the edge communications devices as the unmanned vehicle retraces the path.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
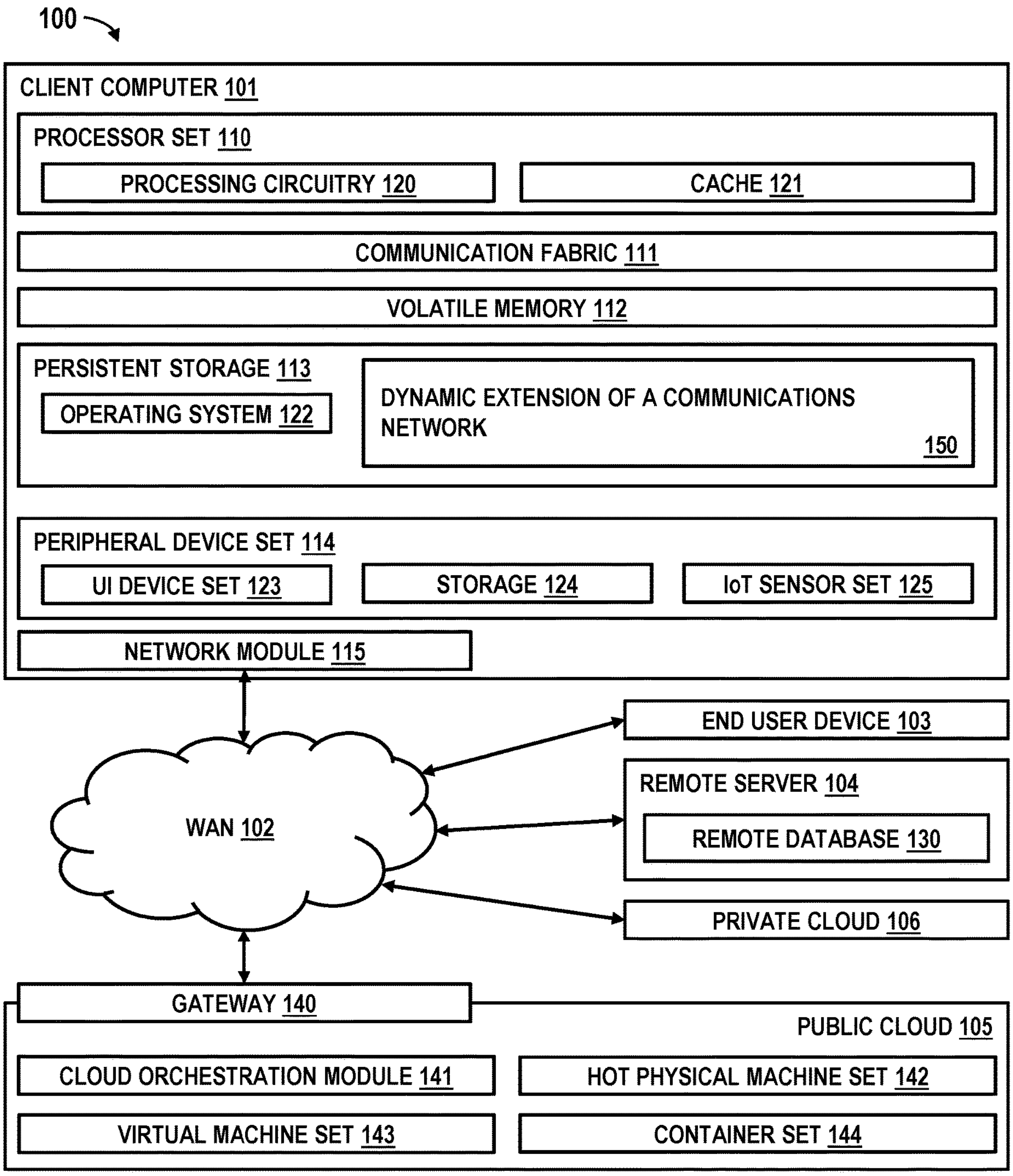
FIG. 1 depicts a block diagram of an example computer system for use in conjunction with one or more embodiments of the present invention.

As discussed above, many environments have limited or non-existent connectivity to a communications network which limits the functionality of computing resources that can be used in these environments. Disclosed herein are methods, systems, and computer program products for dynamically extending a communications network. In exemplary embodiments, an unmanned vehicle is configured to deploy a plurality of edge communications devices in the environment and each of the edge communications devices are configured to establish a peer-to-peer network that expands the coverage of an existing communications network. In various embodiments, the unmanned vehicle may be an aerial vehicle or a terrestrial vehicle and the unmanned vehicle may be remotely controlled or may be autonomous.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as dynamically extending a communications network 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way. EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
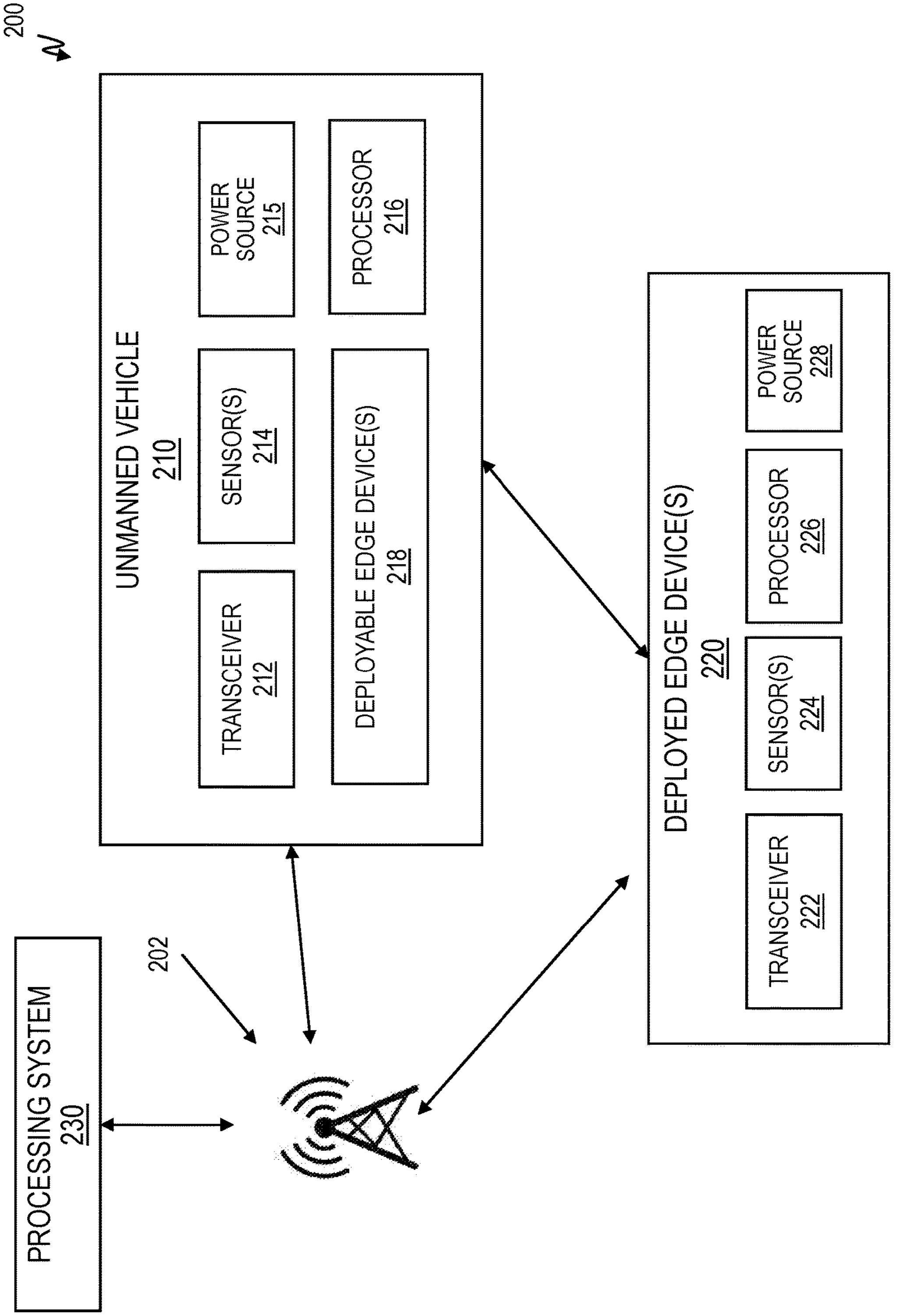
FIG. 2 is a block diagram of a system for dynamically extending a communications network in accordance with one or more embodiments of the present invention.

Referring now to FIG. 2, a system 200 for dynamically extending a communications network in accordance with one or more embodiments of the present invention is shown. As illustrated, the system 200 includes a communications network 202, an unmanned vehicle 210, one or more deployed edge devices 220, and a processing system 230. The communications network 202 may include a cellular communications network, a WiFi network or any other suitable wireless communications network. In exemplary embodiments, the unmanned vehicle 210 includes a transceiver 212, one or more sensors 214, a power source 215, a processor 216, and a plurality of deployable edge devices 218.

In exemplary embodiments, the processor 216 is configured to control the operation of the unmanned vehicle 210. In one embodiment, the processor 216 is configured to utilize the transceiver 212 to measure the quality of a connection between the transceiver 212 and the communications network 202. In one embodiment, the quality of a connection between the transceiver 212 and the communications network 202 is determined based on the signal strength of the communications network 202 at the current location of the unmanned vehicle 210. Upon a determination that the quality of the connection between the transceiver 212 and the communications network 202 has fallen below a threshold value, the processor 216 is configured to deploy one of the deployable edge devices 218. Once a deployable edge device 218 has been deployed by the unmanned vehicle, the deployable edge device 218 becomes a deployed edge device 220.

In exemplary embodiments, the deployed edge device 220 includes a transceiver 222 that is configured to extend the coverage of the communications network 202. The deployed edge device 220 also includes one or more sensors 224, a processor 226, and a power source 228. The processor 226 controls the operation of the deployed edge device 220 including the sensors 224 and of the transceiver 222. In exemplary embodiments, the one or more sensors 224 are configured to periodically collect and store environmental data. In one embodiment, a subset of the collected data may be transmitted to a processing system 230 via the communications network 202. For example, in one embodiment, the sensor 224 is a high-definition camera and the deployed edge device 220 is configured to transmit a lower-resolution image via the communications network 202.

In exemplary embodiments, the sensors 214 of the unmanned vehicle 210 are configured to capture data regarding the environment of the unmanned vehicle 210. In one embodiment, the sensors include one or more of a light detection and ranging (lidar) sensor and an echolocation sensor. The processor 216 is configured to receive data from the sensors 214 and to create, or update, a three-dimensional model of the environment in which the unmanned vehicle 210 is operating. In one embodiment, the processor 216 is configured to make determinations regarding the movement of the unmanned vehicle 210 based on the three-dimensional model of the environment. In exemplary embodiments, the unmanned vehicle 210 is configured to periodically transmit at least a subset of the data collected by the sensors 214 to a processing system 230 via the communications network 202.

In exemplary embodiments, the system 200 includes a processing system 230 that may be embodied in a computer 101, such as the one shown in FIG. 1. The processing system 230 is configured to create an initial path for the unmanned vehicle 210 to travel through an environment. In one embodiment, the initial path is determined based at least in part on previously collected data regarding the environment. In one embodiment, the processing system 230 is configured to create updates to the initial path based on data received from the unmanned vehicle 210 as the unmanned vehicle 210 travels along the initial path. In exemplary embodiments, the processing system 230 is configured to create a three-dimensional model, also referred to as a digital twin, of the environment based on data received from one or more of the unmanned vehicle 210 and the deployed edge devices 220.

Figure 3:
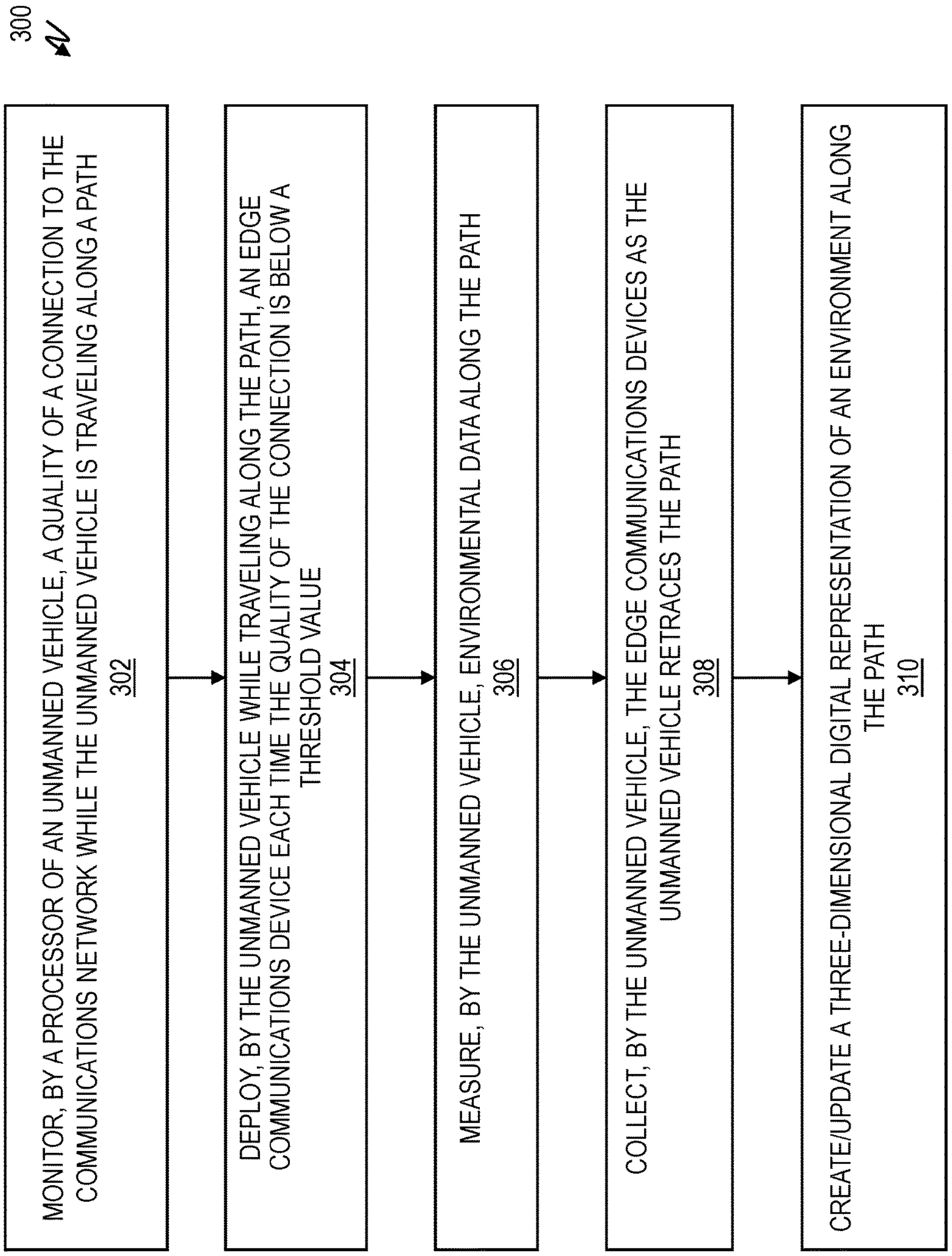
FIG. 3 is a flowchart of a method for dynamically extending a communications network in accordance with one or more embodiments of the present invention.

Referring now to FIG. 3, a flowchart of a method 300 for dynamically extending a communications network in accordance with one or more embodiments of the present invention is shown. As shown at block 302, the method 300 includes monitoring, by a processor of an unmanned vehicle, a quality of a connection to the communications network while the unmanned vehicle is traveling along a path. In exemplary embodiments, the quality of the connection to the communications network includes a signal strength of the communications network observed by the unmanned vehicle. Next, as shown at block 304, the method 300 includes deploying, by the unmanned vehicle while traveling along the path, an edge communications device each time the quality of the connection is below a threshold value. In exemplary embodiments, the edge communications devices are configured to join the communications network and to extend the communications network. In one embodiment, the deployed edge communications devices create a secure peer-to-peer network that facilitates communication between the unmanned vehicle and the communications network.

The method 300 also includes measuring, by the unmanned vehicle, environmental data along the path, as shown at block 306. In exemplary embodiments, the unmanned vehicle includes one or more sensors configured to measure the environmental data along the path. In one embodiment, the collected environmental data is analyzed by the processor and is used to update the path that the unmanned vehicle will travel. In exemplary embodiments, the unmanned vehicle is configured to transmit a subset of the environmental data collected to a processing system via the communications network.

The method 300 also includes collecting, by the unmanned vehicle, the edge communications devices as the unmanned vehicle retraces the path, as shown at block 308. In exemplary embodiments, the unmanned vehicle will retrace the path it took once the environment has been fully explored, after a specified time has passed, or once all of the edge devices have been deployed. As the unmanned vehicle retraces the path, it is configured to collect the deployed edge devices. Once As shown at block 310, in exemplary embodiments, the method 300 includes creating and/or updating a three-dimensional digital representation of an environment as the unmanned vehicle travels along the path. This three-dimensional digital representation is used by the processor of the unmanned vehicle to update the path that the unmanned vehicle will take through the environment. In exemplary embodiments, the unmanned vehicle is an autonomous vehicle, and the processor of the autonomous vehicle is configured to create and/or update the three-dimensional digital representation is and the path that the autonomous vehicle will travel.

Figure 4:
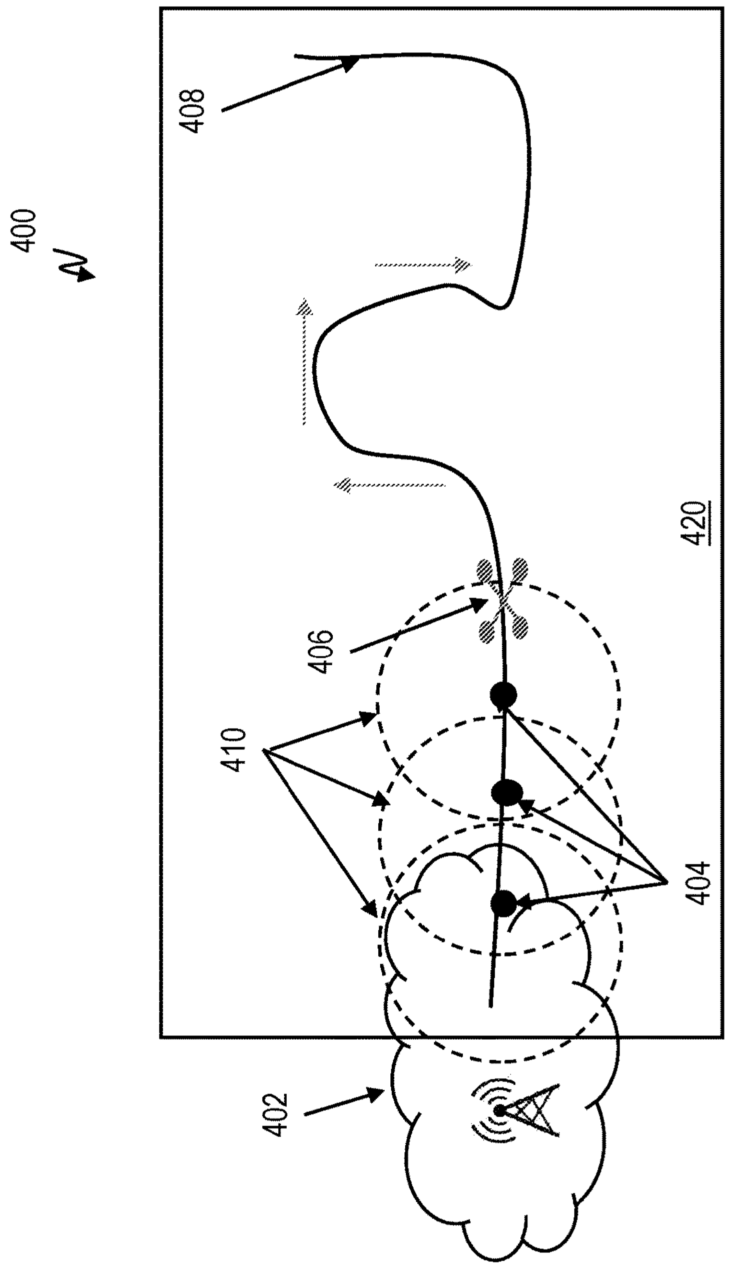
FIG. 4 is a schematic diagram of a system for dynamically extending a communications network in accordance with one or more embodiments of the present invention.

Referring now to FIG. 4, a schematic diagram of a system 400 for dynamically extending a communications network in accordance with one or more embodiments of the present invention is shown. As illustrated, the system 400 includes an unmanned vehicle 406 that is configured to traverse a path 408 through environment 420. Environment 420 includes a communications network 402 that covers at least a portion of the path 408. As the unmanned vehicle 406 travels along the path 408, the unmanned vehicle 406 monitors the quality of its connection to the communications network 402. Based on a determination that the quality of the connection falls below a threshold value, the unmanned vehicle 406 deploys an edge device that is configured to extend the coverage of the communications network 402. As shown each edge device 404 includes a coverage area 410. Once deployed, the edge devices 404 create a peer-to-peer network that is configured to facilitate communication between the unmanned vehicle 406 and the communications network 402.

In exemplary embodiments, the environment 420 may be a hazardous environment such as a mine shaft or other such environment. The sensors disposed on the unmanned vehicle and/or the edge devices can include cameras, accelerometers, lidar sensors, oxygen sensors, methane sensors, and the like. In one embodiment, the unmanned vehicle and/or the edge devices are configured to collect significantly more data that they are configured to transmit via the communications network 402. In these embodiments, only subsets of the data, such as sensor readings above or below specified threshold values, are transmitted via the communications network 402. Once the unmanned vehicle and/or the edge devices have been collected and returned, the remainder of the collected sensor data is downloaded from the unmanned vehicle and/or the edge devices.

In exemplary embodiments, the three-dimensional digital representation of the environment will be updated and enriched by the data collected by the sensors carried by the unmanned vehicle. In one embodiment, the processor disposed on the unmanned vehicle is configured to perform calculations to determine expected behavior or outcomes in the environment, recalibrate next actions of the unmanned vehicle such as path traversal and store such calculations and outcomes in the three-dimensional digital representation for later reference.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for dynamic extension of a communications network, the method comprising:

monitoring, by a processor of an unmanned vehicle, a quality of a connection to the communications network while the unmanned vehicle is traveling along a path;

deploying, by the unmanned vehicle while traveling along the path, an edge communications device each time the quality of the connection is below a threshold value, wherein the deployed edge communications devices create a secure peer-to-peer network that facilitates communication between the unmanned vehicle and the communications network;

collecting, by the deployed edge communications devices, one or more sets of data;

measuring, by the unmanned vehicle, environmental data along the path; and collecting, by the unmanned vehicle, the deployed edge communications devices as the unmanned vehicle retraces the path, wherein only subsets of the environmental data and the one or more sets of data are transmitted via the communications network, and wherein, once the unmanned vehicle and the deployed edge communications devices have been collected and returned, a remainder of the environmental data and the one or more sets of data is downloaded from the unmanned vehicle and the deployed edge communications devices.

2. The method of claim 1, wherein the edge communications devices are configured to join the communications network and to extend the communications network.

3. The method of claim 1, wherein the unmanned vehicle includes one or more sensors configured to measure the environmental data along the path.

4. The method of claim 3, wherein the unmanned vehicle is configured to transmit a subset of the environmental data via the communications network.

5. The method of claim 3, wherein the one or more sensors include one of a light detection and ranging sensor and an echolocation sensor.

6. The method of claim 5, further comprising one or more of creating and updating a three-dimensional digital representation of an environment along the path.

7. The method of claim 5, further comprising updating, by the processor, the path based on the environmental data.

8. A system comprising:

a memory having computer readable instructions; and one or more processors for executing the computer readable instructions, the computer readable instructions controlling the one or more processors to perform operations comprising:

monitoring, by an unmanned vehicle, a quality of a connection to a communications network while the unmanned vehicle is traveling along a path;

deploying, by the unmanned vehicle while traveling along the path, an edge communications device each time the quality of the connection is below a threshold value, wherein the deployed edge communications devices create a secure peer-to-peer network that facilitates communication between the unmanned vehicle and the communications network;

collecting, by the deployed edge communications devices, one or more sets of data;

measuring, by the unmanned vehicle, environmental data along the path; and collecting, by the unmanned vehicle, the deployed edge communications devices as the unmanned vehicle retraces the path, wherein only subsets of the environmental data and the one or more sets of data are transmitted via the communications network, and wherein, once the unmanned vehicle and the deployed edge communications devices have been collected and returned, a remainder of the environmental data and the one or more sets of data is downloaded from the unmanned vehicle and the deployed edge communications devices.

9. The system of claim 8, wherein the edge communications devices are configured to join the communications network and to extend the communications network.

10. The system of claim 8, wherein the unmanned vehicle includes one or more sensors configured to measure the environmental data along the path.

11. The system of claim 10, wherein the unmanned vehicle is configured to transmit a subset of the environmental data via the communications network.

12. The system of claim 10, wherein the one or more sensors include one of a light detection and ranging sensor and an echolocation sensor.

13. The system of claim 12, wherein the operations further comprise one or more of creating and updating a three-dimensional digital representation of an environment along the path.

14. The system of claim 12, wherein the operations further comprise updating, by the processor, the path based on the environmental data.

15. A computer program product comprising a computer readable storage medium having program instructions embodied therewith, the program instructions executable by a processor to cause the processor to perform operations comprising:

monitoring, by an unmanned vehicle, a quality of a connection to a communications network while the unmanned vehicle is traveling along a path;

deploying, by the unmanned vehicle while traveling along the path, an edge communications device each time the quality of the connection is below a threshold value, wherein the deployed edge communications devices create a secure peer-to-peer network that facilitates communication between the unmanned vehicle and the communications network;

collecting, by the deployed edge communications devices, one or more sets of data;

measuring, by the unmanned vehicle, environmental data along the path; and collecting, by the unmanned vehicle, the deployed edge communications devices as the unmanned vehicle retraces the path, wherein only subsets of the environmental data and the one or more sets of data are transmitted via the communications network, and wherein, once the unmanned vehicle and the deployed edge communications devices have been collected and returned, a remainder of the environmental data and the one or more sets of data is downloaded from the unmanned vehicle and the deployed edge communications devices.

16. The computer program product of claim 15, wherein the edge communications devices are configured to join the communications network and to extend the communications network.

17. The computer program product of claim 15, wherein the unmanned vehicle includes one or more sensors configured to measure the environmental data along the path.

18. The computer program product of claim 17, wherein the unmanned vehicle is configured to transmit a subset of the environmental data via the communications network.

19. The method of claim 1, wherein the unmanned vehicle retraces the path once the environment has been fully explored.

* * * * *